(12) United States Patent
Ptacek et al.

(10) Patent No.: US 6,636,972 B1
(45) Date of Patent: Oct. 21, 2003

(54) SYSTEM AND METHOD FOR BUILDING AN EXECUTABLE SCRIPT FOR PERFORMING A NETWORK SECURITY AUDIT

(75) Inventors: Thomas Henry Ptacek, Santa Clara, CA (US); Timothy Nakula Newsham, Kaneohe, HI (US); Oliver Friedrichs, San Jose, CA (US)

(73) Assignee: Networks Associates Technology, Inc., Santa Clara, CA (US)

( * ) Notice: Subject to any disclaimer, the term of this patent is extended or adjusted under 35 U.S.C. 154(b) by 217 days.

(21) Appl. No.: 09/976,815

(22) Filed: Oct. 12, 2001

Related U.S. Application Data

(63) Continuation of application No. 09/235,149, filed on Jan. 21, 1999, now Pat. No. 6,343,362.
(60) Provisional application No. 60/098,787, filed on Sep. 1, 1998.

(51) Int. Cl.[7] ................................................ G06F 11/30
(52) U.S. Cl. ...................................................... 713/201
(58) Field of Search ........................... 713/201; 709/230, 709/238; 717/135

(56) References Cited

U.S. PATENT DOCUMENTS 5,838,919 A * 11/1998 Schwaller et al. .......... 709/224
5,961,644 A    10/1999 Kurtzberg et al.
6,088,804 A     7/2000 Hill et al.
6,484,261 B1 * 11/2002 Wiegel ....................... 713/201

* cited by examiner

Primary Examiner—Thomas M. Heckler
(74) Attorney, Agent, or Firm—Patrick J. S. Inouye; Christopher J. Hamaty

(57) ABSTRACT

A system and method for building an executable script for performing a network security audit is described. A source program expressed in a network packet simulation language is stored. The same program includes a plurality of statements encoding logic to simulate an exchange of network protocol compliant-packets. Each statement is scanned into a sequence of individual tokens. Each token is parsed into grammatical phrases comprising at least one of an expression and a control construct. Each expression evaluates a data value. Each control construct defines a process flow. The grammatical phrases are compiled into program instructions to execute the logic on a target machine.

19 Claims, 3 Drawing Sheets

Microfiche Appendix Included
(1 Microfiche, 27 Pages)

SYSTEM AND METHOD FOR BUILDING AN EXECUTABLE SCRIPT FOR PERFORMING A NETWORK SECURITY AUDIT

CROSS-REFERENCE TO RELATED APPLICATIONS

The present application is a continuation of Ser. No. 09/235,149 filed Jan. 21, 1999, now U.S. Pat. No. 6,343,362, issued Jan. 29, 2002, which is a conversion of commonly-owned U.S. Provisional Patent Application Ser. No. 60/098,787, filed Sep. 1, 1998, the disclosures of which (including any attachments and appendices thereof) are incorporated by reference and the priority filing dates of which are claimed.

REFERENCE TO MICROFICHE APPENDIX

A microfiche appendix is part of the specification, which includes one microfiche of 27 frames.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer networks and, more particularly, to system and methods for facilitating the task of simulating attacks against computer networks.

The first personal computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs." In both cases, maintaining security and controlling what information a user of a personal computer can access was relatively simple because the overall computing environment was limited and clearly defined.

With the ever-increasing popularity of the Internet, particularly the World Wide Web ("Web") portion of the Internet, however, more and more personal computers are connected to larger networks. Providing access to vast stores of information, the Internet is typically accessed by users through Web "browsers" (e.g., Microsoft Internet Explorer or Netscape Navigator) or other "Internet applications." Browsers and other Internet applications include the ability to access a URL (Universal Resource Locator) or "Web" site. The explosive growth of the Internet had a dramatic effect on the LANs of many businesses and other organizations. More and more employees need direct access through their corporate LAN to the Internet in order to facilitate research, competitive analysis, communication between branch offices, and send e-mail, to name just a few.

As a result, corporate IS (Information Systems) departments now face unprecedented challenges. Specifically, such departments, which have to date operated largely in a clearly defined and friendly environment, are now confronted with a far more complicated and hostile situation. As more and more computers are now connected to the Internet, either directly (e.g., over a dial-up connection with an Internet Service Provider or "ISP") or through a gateway between a LAN and the Internet, a whole new set of challenges face LAN administrators and individual users alike: these previously-closed computing environments are now opened to a worldwide network of computer systems. In particular, systems today are vulnerable to attacks by practically any perpetrators (hackers) having access to the Internet Many security holes are conceptually simple and are, therefore, easily explained. Consider, for example, the following scenario: "send two IP packet fragments, one of which overlaps the other." This corresponds to the notorious "teardrop" bug, which crashes Linux and Windows NT. Although the foregoing is easy to describe in English, the programming task of actually sending two IP fragments that overlap each other can be extraordinarily tricky using commonly-available programming languages (e.g., the "C" programming language), and virtually impossible to implement in high-level languages like Perl.

Some security issues may not be "bugs", per se, but rather techniques used by attackers to gain information about or subvert the security of networked hosts. For instance, a popular trick used by hackers to almost-undetectably see what programs are running on a machine is the "stealth port scan": several TCP protocol tricks allow attackers to see if a connection can be made to a port, without actually opening a connection. The actual programs required to perform such a feat tend to be long, complex, and OS-specific. As a result, security professionals are forced to spend valuable time fishing through hacker-exploit code to find poorly-written Linux programs that do not even compile. This time could be better spent quickly writing the equivalent in portable, simple CASL code, which will not only run on the machines they need to run on, but also work exactly how they need to work.

Attempting to write these programs using existing programming languages, such as the "C" programming language, is not practical. While security tools may certainly run a bit faster if hand-coded in "C", the runtime speed benefits are probably not outweighed by the development speed costs. A "C" programmer needs to worry about memory allocation, portable network I/O, and several other issues ranging from error handling to byte ordering.

What is needed is a system that allows the system administrator or the programmer to focus on network security programs—what is happening on the network—and not worry about issues attendant to conventional programming environments, such as C. Such a system should facilitate the task of testing network security by providing methodology that allows a user (administrator) to develop test programs without having to build network packets (i.e., communication-protocol packets) or otherwise write raw network code. The present invention fulfills this and other needs.

SUMMARY OF THE INVENTION

A development system providing a Custom Attack Simulation Language (CASL) for testing networks is described. In particular, the development system implements methodology for facilitating development of network attack simulations. The system includes an editor or authoring system for creating a source code description or Scripts (i.e., CASL-syntax Script) of the simulation program under development. The Scripts, in turn, are "compiled" by a CASL compiler into a compiled CASL program, that may then be used to simulate attacks against a network.

CASL makes it easier for users, particularly network and system administrators, to experiment with and learn about the way their networks operate. Since networks work by exchanging packets (i.e., communication-protocol packets) of information, CASL focuses on allowing users to read and write packets directly to and from the network. CASL functions as a scripting language—a high level programming language, like Perl, Python, or Tcl. Unlike general-purpose scripting languages, CASL is designed specifically to make it easy to construct, read, and write raw network packets. CASL is intended primarily for security auditing applications; that is to say, CASL is intended to simulate attacks against hosts in order to see if those hosts are vulnerable to attacks of a given nature. CASL is particularly oriented towards low-level network attacks which require packet forgery.

The major difficulty in writing raw network code is not the actual act-of sending a packet across the network, but rather the complexity of building the packets themselves. To address that problem, CASL includes facilities specifically designed to make it easy to build packets for arbitrary protocols (not just IP, UDP, and TCP). By making it easy to write programs that deal with raw IP packets, CASL allows users to easily simulate protocol-level bugs, including allowing them to test their machines for potential vulnerability to such bugs.

A method of the present invention for creating programs that simulate attacks against a computer network, embodied in a computer system, includes the following method steps. At the outset, a language specification providing native support for custom attack simulations is specified; the language specification provides primitives facilitating simulation of an attack against a computer network. A run-time library (stand-alone or embedded, as desired) is provided that includes built-in routines facilitating simulation of an attack against a computer network, where the built-in routines are capable of being invoked through the primitives. Next, a program script is created that specifies program instructions for simulating an attack against a computer network. The program script employs at least some of the primitives for simulating an attack against a computer network. Finally, the program script is compiled into a compiled program, with the compiled program being deployed together with the run-time library to simulate an attack against a computer network.

An embodiment of the present invention provides a system and method for building an executable script for performing a network security audit. A source program expressed in a network packet simulation language is stored. The same program includes a plurality of statements encoding logic to simulate an exchange of network protocol compliant-packets. Each statement is scanned into a sequence of individual tokens. Each token is parsed into grammatical phrases comprising at least one of an expression and a control construct. Each expression evaluates a data value. Each control construct defines a process flow. The grammatical phrases are compiled into program instructions to execute the logic on a target machine.

A further embodiment provides a system and method for directly exchanging packets over a network using scripted instructions. A packet in accordance with a network protocol is built by executing program instructions compiled from a source program expressed in a network packet simulation language. The packet is written directly onto the network.

A further embodiment provides a system and method for implementing a language specification for simulating network protocol-compliant packets. A language specification providing a grammar for constructing statements encoding logic to simulate an exchange of network protocol compliant-packets is defined. Variables under the language specification are specified. Each variable includes an identifier referencing a memory location within which to store a data object. Statements under the language specification are expressed. Each statement includes at least one of control constructs determining control flow through the encoded logic and expressions evaluating to at least one such data object.

All told, CASL provides an extremely flexible and general way to manipulate networks. Its presentation as a programming language allows it to accomplish a virtually limitless number of tasks, and its protocol spoofing capabilities provide a means to do tasks that typically require hundreds of lines of code using conventional programming language environments (e.g., "C" language code) in just a few lines (e.g., 10) of CASL code.

DETAILED DESCRIPTION

The following description will focus on the presently-preferred embodiment of the present invention, which is operative in an Internet-connected environment, including, for instance, client machines running under the Microsoft® Windows environment and connected to an open network, such as a WAN or the Internet. The present invention, however, is not limited to any particular one application or any particular environment. Instead, those skilled in the art will find that the system and methods of the present invention may be advantageously applied to a variety of system and application software, including database management systems, word processors, spreadsheets, and the like, operating on a variety of different platforms, including Macintosh, UNIX, NextStep, and the like. Therefore, the description of the exemplary embodiments which follows is for purposes of illustration and not limitation.

Development System Architecture

A. System Hardware (for Client and/or Server Machines)

Figure 1:
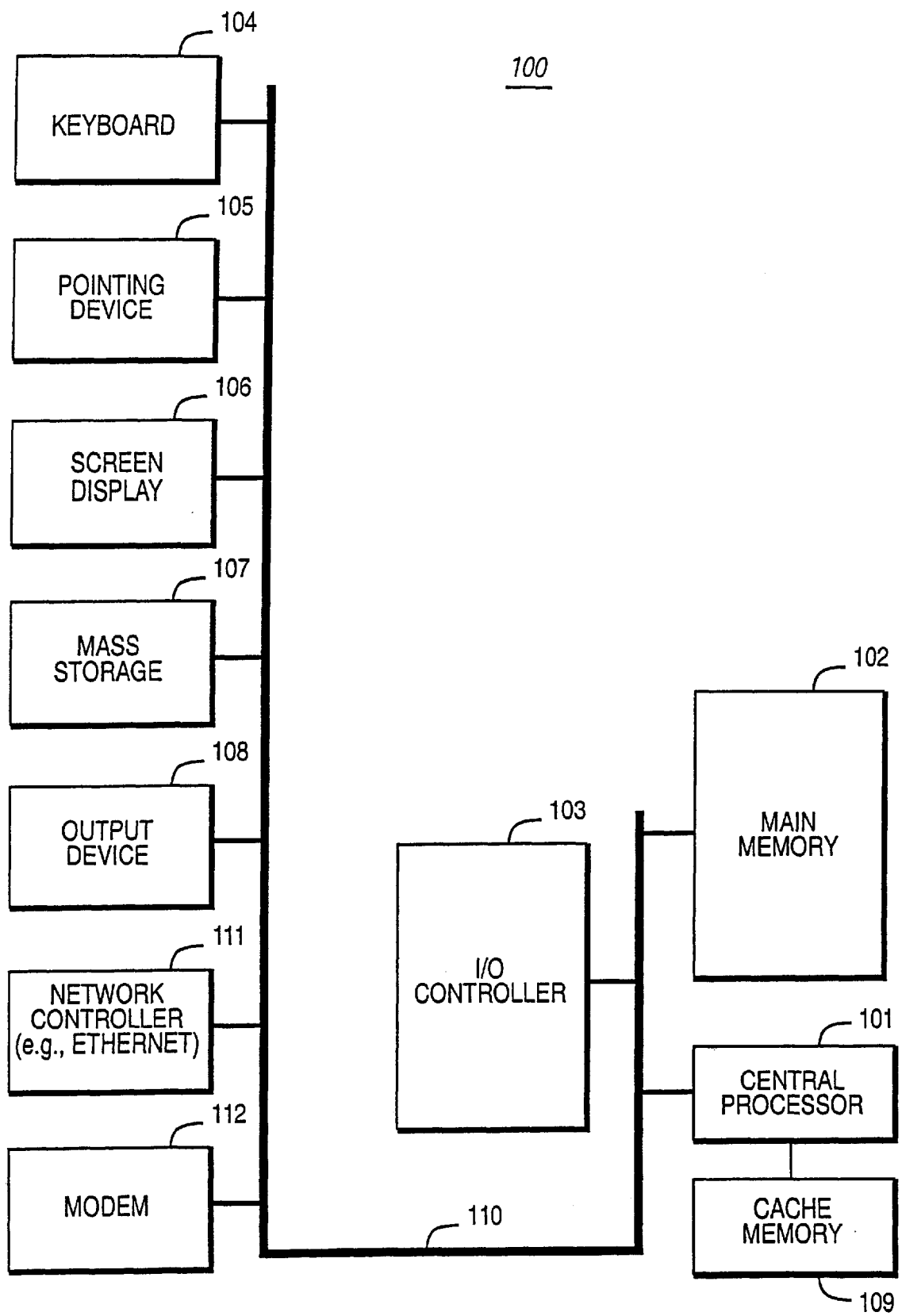
FIG. 1 is a high-level block diagram illustrating a computer in which the present invention may be embodied.

The invention is generally embodied on a computer system including one or more computer systems, such as computer system 100 of FIG. 1, operating on a network. System 100 comprises a central processor 101, a main memory 102, an input/output controller 103, a keyboard 104, a pointing device 105 (e.g., mouse, track ball, pen device, or the like), a display or screen device 106, and a mass storage 107 (e.g., hard or fixed disk, removable floppy disk, optical disk, magneto-optical disk, or flash memory), a network interface card or controller 111 (e.g., Ethernet), and a modem 112 (e.g., 28.8K baud modem or ISDN modem). Although not shown separately, a real-time system clock is included with the system 100, in a conventional manner. Processor 101 includes or is coupled to a cache memory 109 for storing frequently accessed information; memory 109 may be an on-chip cache or external cache (as shown). One or more input/output device(s) 108, such as a printing device or slide output device, are included in the system 100, as desired. As shown, the various components of the system 100 communicate through a system bus 110 or similar architecture. The system itself communicates with other systems via a network interface card 111 (e.g., available from 3Com) and/or modem 112 (e.g., available from U.S. Robotics), connected to a network (e.g., Ethernet network). In a preferred embodiment, the system 100 includes an IBM PC-compatible personal computer, available from a variety of vendors (including IBM of Armonk, N.Y.). I/O device 108 may include a laser printer, such as an HP LaserJet printer, which is available from Hewlett-Packard of Palo Alto, Calif.

B. System Software

Figure 2A:
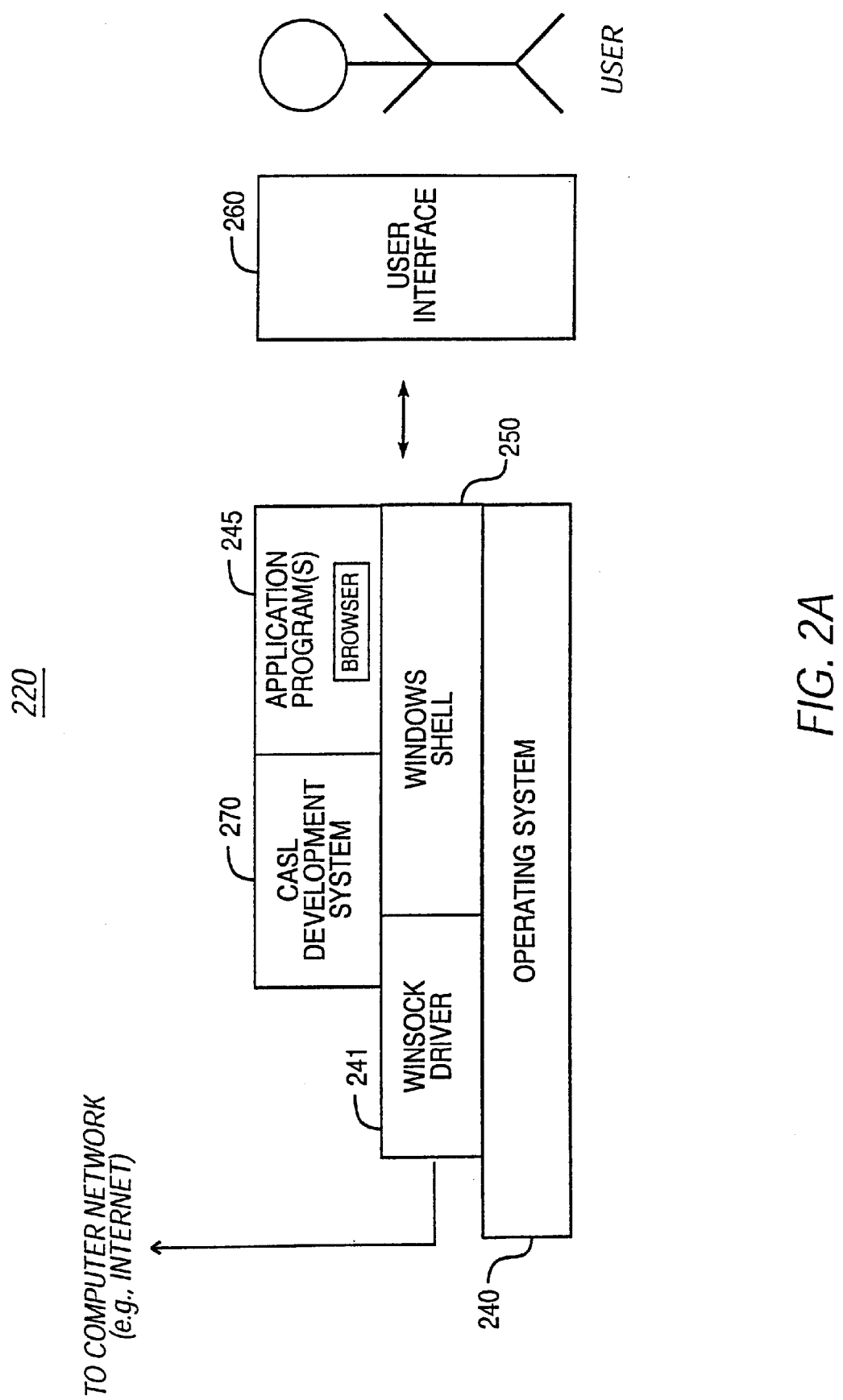
FIG. 2A is a high-level block diagram illustrating a software system for controlling the operation of the computer of FIG. 1.

Illustrated in FIG. 2A, a computer software system 220 is provided for directing the operation of the computer system 100. Software system 220, which is stored in system memory 102 and on storage (e.g., disk memory) 107, includes a kernel or operating system (OS) 240 and a windows shell 250. One or more application programs, such as client application software or "programs" 245 may be "loaded" (i.e., transferred from storage 107 into memory 102) for execution by the system 100. Client application software includes a communication layer or driver 241 (e.g., Microsoft Winsock) for communication with a network, such as the Internet.

System 220 includes a user interface (UI) 260, preferably a Graphical User Interface (GUI), for receiving user commands and data. These inputs, in turn, may be acted upon by the system 100 in accordance with instructions from operating module 240, windows 250, and/or client application module(s) 245. The UI 260 also serves to display the results of operation from the OS 240, windows 250, and application(s) 245, whereupon the user may supply additional inputs or terminate the session. OS 240 and windows 245 can be provided by Microsoft® Windows 95/98, or by Microsoft® Windows NT; these are available from Microsoft Corporation of Redmond, Wash. Alternatively, OS 240 and windows 245 can be provided by IBM OS/2 (available from IBM of Armonk, N.Y.) or Macintosh OS (available from Apple Computers of Cupertino, Calif.). Although shown conceptually as a separate module, the UI is typically provided by interaction of the application modules with the windows shell, both operating under OS 240.

C. Development System

Of particular interest, the system 220 includes a development system providing a Custom Attack Simulation Language (CASL) 270 of the present invention for testing networks. Construction and operation of the development system 270, including its methodology for facilitating development of network attack simulations, will now be described in further detail.

Figure 2B:
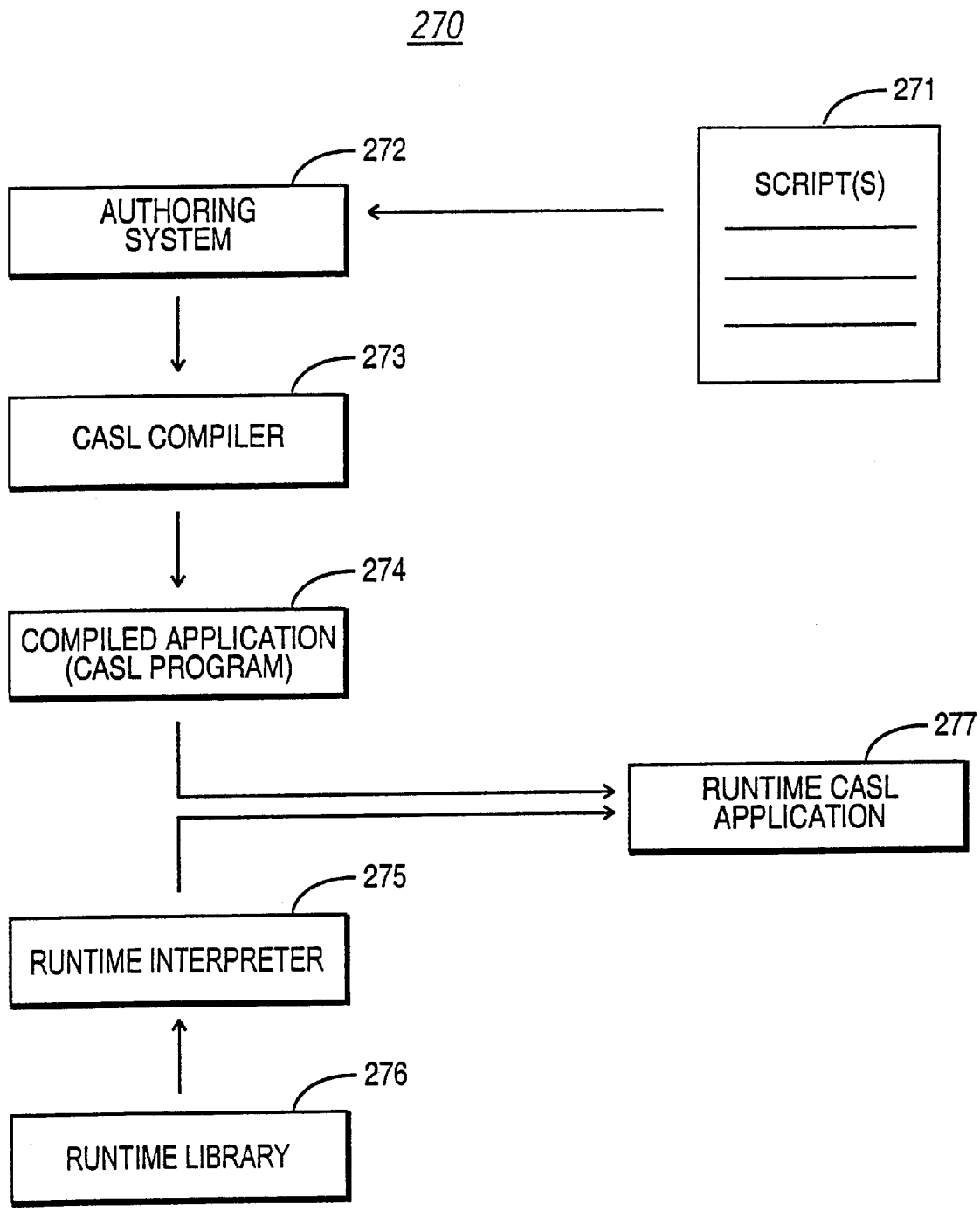
FIG. 2B is a high-level block diagram illustrating a development system of the present invention, for developing network attack simulation programs.

FIG. 2B is a high-level block diagram illustrating the development system 270. During typical use of the system, a developer (e.g., network administrator) employs editor or authoring system 272 for creating a source code description or Scripts 271 (i.e., CASL-syntax Script) of the simulation program under development. A conventional text editor may be employed, at this point, if desired. The Scripts 271, in turn, are "compiled" by the CASL compiler 273, for creating a binary representation of the program under development. In basic operation, the compiler includes a scanner that reads a source program and breaks it apart into a sequence of tokens, which include identifiers, delimiters, numbers, operators, and the like. In turn, the tokens are read by the compiler's parser, which understands the semantics of the source language. In the syntax of the C programming language, for example, the expression A=B+C tells the computer to add the values of B and C together to obtain a new value, which is assigned to A. For an introduction to the general construction and operation of compilers and parsers, see e.g., Fischer et al., *Crafting a Compiler with C*, Benjamin/Cummings Publishing Company, Inc., 1991, the disclosure of which is hereby incorporated by reference.

As shown, the compiler 273 emits compiled application program 274. In one embodiment, for example, the compiled application program may comprise a bytecode sequence encoding opcode instructions; in an alternative embodiment, the compiled application program may comprise native machine code for a target processor (e.g., Intel x86 family of microprocessors), if desired. Here, the compiler emits bytecode which is a pre-compiled intermediate code having a format allowing it to be executed by a runtime module or interpreter 275. At runtime, the bytecode is interpreted by the runtime interpreter 275 which, in turn, executes the logic embodied in the bytecode program on a particular target machine. The bytecode program which is executed repeatedly calls into the runtime library 274 for invoking various CASL runtime functions (described below). In this manner, the application is deployed, together with a runtime module or interpreter 275 and runtime library 276, as a runtime application 277 at a target machine.

Methodology for Building an Executable Script for Performing a Network Security Audit A. General The system 270 implements methodology providing a Custom Attack Simulation Language (CASL) that serves as an exploration tool for network protocols. CASL makes it easier for users, particularly network and system administrators, to experiment with and learn about the way their networks operate. Since networks work by exchanging packets of information, CASL focuses on allowing users to read and write packets directly to and from the network. CASL functions as a scripting language—a high level programming language, like Perl, Python, or Tcl. Unlike general-purpose scripting languages, CASL is designed specifically to make it easy to construct, read, and write raw network packets. CASL is intended primarily for security auditing applications; that is to say, CASL is intended to simulate attacks against hosts in order to see if those hosts are vulnerable to attacks of a given nature. CASL is particularly oriented towards low-level network attacks which require packet forgery. All told, CASL provides an extremely flexible and general way to manipulate networks. Its presentation as a programming language allows it to accomplish a virtually limitless number of tasks, and its protocol spoofing capabilities provide a means to do things that require hundreds of lines of "C" code in less than 10 lines of CASL code.

B. High-level Programming Language Approach: CASL

By making it easy to write programs that deal with raw IP packets, CASL allows users to easily simulate protocol-level bugs, including allowing them to test their machines for potential vulnerability to such bugs. Consider, for instance, a popular trick used by hackers to almost-undetectably see what programs are running on a machine is the "stealth port scan": several TCP protocol tricks allow attackers to see if a connection can be made to a port, without actually opening a connection. The actual programs required to perform such a feat tend to be long, complex, and OS-specific. As a result, security professionals are forced to spend valuable time fishing through hacker-exploit code to find poorly-written Linux programs that do not even compile. This time could be better spent quickly writing the equivalent in portable, simple CASL code, which will not only run on the machines they need to run on, but also work exactly how they need to work.

Attempting to write these programs using existing programming languages, such as the "C" programming language, is not practical. A "C" programmer needs to worry about memory allocation, portable network I/O, and several other issues ranging from error handling to byte ordering. In accordance with the present invention, therefore, CASL programs are designed such that the programmer does not need to worry about these issues; rather, the programmer can focus on what really matters in network security programs—what is happening on the network. Attempting to write these programs using higher-level programming languages, such as Perl, is also not practical. While extensions to interpreters exist to write and read raw packets, they are generally not portable, and therefore can only be used to address a small part of the problem. The major difficulty in writing raw network code is not the actual act of sending a packet across the network, but rather the complexity of building the packets themselves. By providing CASL, the present invention provides facilities specifically designed to make it easy to build packets for arbitrary protocols (not just IP, UDP, and TCP).

Perhaps the best way to examine the use of CASL in the system of the present invention is to review an example of an actual CASL script. The following is a detailed description of CASL but which has been simplified for clarity of description. The following assumes that the reader has an understanding of IP networking, including assuming that the user knows how the IP protocols work at a fairly low level. Basic IP networking concepts are described in the technical, trade, and-patent literature; see, e.g., Parker, Timothy et al., *TCP/IP Unleashed*, Sams Publishing, 1996, the disclosure of which is hereby incorporated by reference. Additionally, the following description assumes at least some familiarity with basic programming techniques. While CASL can be used with no programming experience to forge arbitrary packets, effective tool development requires at least some familiarity with basic programming concepts. For an introductory description of the C++ programming language, see e.g., Lippman, Stanley, C++ Primer, Second Edition, Addison-Wesley, 1991, the disclosure of which is hereby incorporated by reference. Any experience with languages like Bourne shell script, Perl, Tcl, or even complicated DOS "batch" files, will likely suffice.

Since CASL is designed to test real network security holes by directly manipulating networks, CASL is capable of disrupting and even disabling networks. Therefore, appropriate precautions must be taken before one actually tests CASL scripts on a network. It is recommended that one conduct tests on non-critical "test" networks before deploying them on mission-critical networks.

CASL Design and Operation

A. Language Overview: Statements, Types, Comments, and Packets

Before presenting the example script, a basic overview of the CASL language is helpful. CASL programs consist of statements operating on variables. A statement is anything that "does" something, from calculating the value of "2+2" to reading in a UDP (User Datagram Protocol) packet. All statements end with a semicolon, thereby allowing the CASL interpreter to tell where statements end, including allowing the language to be almost completely whitespace insensitive. A variable is a name attached to some piece of information, be it the number "2" to a protocol-specific (e.g., an ICMP) header. CASL statements are built out of a limited number of basic operations. CASL statements may employ C/C++-style comments that are ignored by the interpreter and are either single-line or multi-line. A single-line comment begins with "//". A multi-line comment begins with "/*" and ends with "*/".

Like many scripting languages, CASL variables need not specify an explicit "type". A CASL variable can, for instance, be a string, an integer, or a packet, without ever telling the CASL interpreter beforehand which of these the variable was intended to be. On the other hand, there exist a finite number of "types" of variables, such as characters, numbers, strings, buffers, and lists. As described below, the system provides data types suitable for storing and processing packet definitions.

Representative data types are as follows.

A "character" is one specific ASCII character (e.g., the letter c, the BEEP character, or the like). Characters in CASL are represented in single quotes (e.g., 'c').

Numbers in CASL are integral; floating-point, decimal-pointed numbers are presently not supported in the CASL language (but may be implemented by those skilled in the art, if desired). In the currently-preferred embodiment, CASL does not currently support numbers less than zero; however, arithmetic operations with negative (signed) numbers may be implemented by one skilled in the art, if desired. CASL integers are represented simply as numbers, without quoting; they can also be specified in hexadecimal by preceding them with "0x", as in the "C" language.

Strings in CASL, unlike "C" and like Perl, are not arrays of characters. A string is any sequence of characters enclosed in double quotes, such as "hello, world!". Strings can also contain control sequences, which are backslash-quoted codes that represent things like new-lines and tabs. These codes correspond to the "C" language equivalents (e.g., '\n' is a newline, '\t' is a tab).

A buffer holds an arbitrary collection of data, and is typically used to represent input packets and protocol headers. Packet definitions are laid over buffers to allow easy access to header fields; this mimics the way packet construction is typically accomplished in "C".

Lists are also collections of data; however, unlike buffers, each distinct data element stored in a list is a separate entity, which can easily be added or removed from the list. Lists grow and shrink dynamically, as elements are added or removed from them.

A packet that is to be output onto the network is represented in CASL as a list. A packet that has been input from the network is represented as a buffer.

CASL does not have any "built-in" packet types but, instead, provides a means to define any arbitrary packet type. Even simple IP and TCP headers must be defined using the CASL language. Fortunately, the user is not required to do any of this basic work; CASL is distributed with scripted definitions of the basic IP protocols. To gain access to these definitions, the scripts that define them are "included" into the user's script. This is done using a C-style #include directive, such as follows.

include "tcpip.casl"

This line adds the contents of the file "tcpip.casl" to the current script; "tcpip.casl" contains header definitions for the basic IP protocols. Definitions lay out exactly how parts of packets look, so that they can be written correctly to the network. For instance, a UDP header definition might be provided as follows.

```
define udp {
        udp_source       :  16 bits;
        udp_destination  :  16 bits;
        udp_length       :  16 bits;
        udp_cksum        :  16 bits;
}
```

Here, the define keyword tells the CASL interpreter that this statement defines a new protocol definition, named "udp". The actual definition is (required to be) enclosed in curly braces. The actual contents of the definition include a series of field definitions. Each field definition consists of the name of the field, followed by the size of the value of that field. For instance, "udp_length" denotes a 16-bit field, named "udp length", that is 32-bits into the UDP header (it is preceded by the source and destination ports).

Protocol structures are instantiated in CASL scripts using C++-style new operator. A variable is created to hold the protocol header, and the header is assigned to it.

```
udpheader = new udp;
```

This statement creates a new variable named "udpheader", and assigns to it a newly created UDP header structure. To access the individual fields of the new structure, one references the variable and field name using familiar dot notation.

```
udpheader.udp_length = 10;
```

This statement assigns the value 10 to the "udp_length" field of the variable "udpheader". It is a checked error to assign to a field of a variable that is not that type of structure; for instance, an error would result with the following:

```
udpheader.tcp_length = 10;
```

The error occurs because "udpheader" does not contain a field called "tcp_length". It is worth noting that the value "10" will be represented as a 16-bit number, and in network-byte order; no processing need be done before assigning simple numbers to protocol fields.

B. Statements and Expressions

With a basic understanding of the CASL language, the reader is now better able to undertake a detailed review of the syntactical elements that comprise a CASL program. CASL programs are basically composed of statements. These statements in turn are composed from control constructs and expressions. A control construct is a statement that affects the manner in which the flow of the program goes; these include loops (e.g., while and for) and conditionals (e.g., if). Expressions are sentences in CASL that evaluate to some value; any expression can be assigned to a variable. Unlike many programming languages, CASL allows statements to be executed in global scope. This means that a user can create a program without ever creating any "routines". There is no need (and currently no support) for the use of an entry-point main( )function in CASL.

Variables in CASL are dynamically typed. Since they do not have a declared type, variables do not need to be declared prior to use; the user can make up any name at any time, assign to it, and the user will have created a new variable. There are five different variable types: character, integer, string, buffer, and list. These are explained in further detail.

1. Characters

Characters are single ASCII characters, and are represented in CASL language in single quotes; 'a', 'c', and '\n' are all characters ('\n' is the newline character; "\" quotes a character, usually forming a control character like newline.).

2. Integers

Integers are integral values equal to or greater to zero; negative is currently not supported. These values are represented internally as 32-bit quantities. In CASL scripts, integers can be represented as simple numbers, or, preceded by "0x", as hexadecimal quantities.

3. Strings

Strings are any number of characters enclosed in double-quotes, such as "hello world!". In the "C" language, strings are arrays of characters; CASL treats strings as built-in types, and not as arrays (much like Perl).

4. Complex Types (Buffers and Lists)

The two complex types are "buffer" and "list". Both of these types of variables can contain many pieces of information. Buffers express this information as a contiguous sequence of bytes, while lists express information as a discrete series of variables. Buffers are used primarily to hold packet structures. and input packets.

C. Syntax

1. Statements

Almost all CASL code consists of statements. All statements, excepting the control constructs, are terminated with a semicolon. They are all case sensitive, and, with few exceptions, are white-space insensitive. The user can indent and space a CASL program in any way he or she sees fit. A single statement can stand on its own. A collection of statements can be grouped together and treated as a single statement by; enclosing the group in curly braces.

The bulk of all CASL statements are expressions. There are many different kinds of expressions, and can include subroutine calls, mathematical functions, list operations, and buffer extraction. Assignments are also expressions, and assignments therefore can be assigned to variables. For the purposes of control statements, the value "0" is equivalent to "false", and any nonzero value is equivalent to "true".

2. Comments

One part of CASL code that is not technically a statement is a comment. Comments are remarks left in the CASL source code intended for the readers of the program, to document the source. Comments are ignored completely by the interpreter. Comments can be single-line or multi-line. A single-line comment is started by the "//" sequence, and continues to the end of the line. A multi-line comment starts with "/", and does not end until the interpreter sees the closing "*/" comment.

3. Variables

The most basic element of a CASL script is a variable name. Variable names, by convention, always start with a letter, and consist of zero or more trailing letters, numbers, or the underscore "_" character. "foo", "bar_baz", "i", and "z1" are all valid variable names. "1a" and "a@b" are not.

4. Assignments

Variable names are not valid until they are used (i.e., assigned into). The CASL assignment operator is "="; an assignment expression takes the value of the expression to the right of the "=" and assigns it to the variable on the left. The variable assigned to need not exist beforehand. For instance, "i=c" assigns the value of the variable "c" to "i"; "c" must exist beforehand, "i" does not necessarily need to.

5. The "copy" Operator

Assignments of list and buffer types occurs by reference—that is to say, assigning one buffer to another variable name does not copy the buffer, but rather causes the new variable to point to the same buffer as the one being assigned from. There are times when this approach is desirable; however, there are also many scenarios in which this is not the optimal behavior. Template packet assignment is a good example of the former, for instance; modifying the "new" variable should not affect the original template. In order to address this issue, CASL provides a copy operator. The copy operator takes one operand—a data element of any type supported by CASL—and returns a copy of the item. The copy works for lists, buffers, and all the basic types supported in CASL.

6. Math

CASL supports standard mathematical operations, such as are common in modern-day programming environments. Such operations include addition, subtraction, multiplication, and division, represented respectively by "+", "−", "*", and "/". Mathematical operations are usually used only in assignment statements; for instance, to increment the variable "i" by one, use, "i=i+1".

7. Comparison

Typically, a program will need to examine the value of an expression to determine what to do in a given situation. For example, a program may want to undertake a particular course of action if an ip_input( ) call (i.e., library retain described below) does not read a packet. Exemplary operators provided to test the value of an expression include the following.

- x > y "x is greater than y"
- x < y "x is less than y"
- x > y "x is greater than or equal to y"
- x <= y "x is less than or equal to y"
- x == y "x is exactly equal to y"
- x != y "x is not equal to y"

The basic C-style comparisons "!=" and "==" (inequality and equality) apply to all of the CASL types. Two strings can be tested for equality using the equality comparison operator, and two buffers can be tested for inequality with the appropriate operator. Data varying in size will, by convention, compare false, as will lists with differing numbers of elements.

8. Expression Syntax

An expression enclosed in parenthesis "(" ")" is treated and evaluated as a single expression. Parentheses are useful to disambiguate complicated expressions, where the interpreter can become confused as to which words belong to which expression. For example, to compare the value of an assignment, the assignment expression should be enclosed in parentheses, like:

```
if((i = 1) == 1)
    print(i);
```

Expressions can be inverted for comparison with the C-style "!" operator; an expression preceded with a "!" evaluates false if its value is nonzero. For instance, to do something if "i" is NOT "1", the user can specify the following.

```
if(! (i == 1))
    print(i);
```

Negation with "!" is most useful when comparing something to zero. "!z" evaluates true if "z" is zero. An easy way to combine these rules to see if a packet is read from ip_input( ) (library function described below), as follows.

```
if(! (packet = ip_input(2000, filter))
    print("did not get a packet");
```

The user does not need to explicitly compare an expression's value to ">0" to see if its nonzero (for instance, "if(i>0)"). If the expression evaluates nonzero, it will evaluate true; if not, it will evaluate false, for instance as demonstrated below.

```
if(i)
    print(i);
else
    print("i is zero");
```

This prints the value of "i" if "i" is not zero.

9. Boolean Conditions

Within the context of a boolean expression, two special operators are provided, the AND and OR operators. AND, represented as the C-style "&&", joins a series of expressions together and returns 1 if all of them evaluate true. OR, represented as C-style "||", returns 1 if ANY of them evaluate true.

AND and OR operators in CASL evaluate left-to-right. Both boolean conditions "short-circuit": as soon as a condition arises that satisfies the expression conclusively (a subexpression of an AND statement evaluates false, or a subexpression of an OR statement evaluates true), the boolean expression ceases to evaluate and program flow continues. This is demonstrated as follows.

```
1 && 3 && 2
```

This evaluates to true, because all of the subexpressions evaluate true. On the other hand, the following statement does not evaluate to true.

```
1 && 0 && foo();
```

Not only does not evaluate true (the AND statement groups "0" into the expression which evaluates false), but also it never causes "foo( )" to be called, since the expression is short-circuited after the second subexpression.

10. Control

Control statements affect the flow of control of a program. Control statements are either loops, which cause a piece of code to be executed zero or more times, or conditionals, which cause a piece of code to be executed only if the condition is satisfied. Note that none of the control statements are terminated with a semi-colon. Instead, control statements operate on other statements.

11. Loops a. While

A while statement represents a loop that is not implicitly terminated. The while loops execute their bodies until their conditional argument is satisfied. A while loop appears as illustrated below.

> while(conditional) statements

Here, the conditional is an expression, and statements is a statement or a group of statements enclosed in curly braces. For instance, > while(i > 0)
> i = i − 1;

The above is a simple example of a while loop.

b. For

A C-style for statement represents a loop that usually has implicit termination. The for statements consist of three parts: an initializer, a conditional, and an iterator. The initializer is intended to set up a counter or some other placeholder variable for the loop. The conditional works the same way a while conditional works, terminating the loop when the condition evaluates false. The iterator is intended to move the loop forward, typically advancing or decrementing a counter. Each part of a for statement is separated by a semicolon.

An example of a for loop is as follows.

```
for(i = 0; i < 10; i = i + 1)
    print(i);
```

The above example executes the code print (i) ten times, starting with "i" equal to zero (outputting "0"), and executing the last statement with "i" equal to "9", and terminating when "i" evaluates to "10". The statement for (;;) is a legal statement representing an infinite loop.

c. Loop Control

While in the body of a loop, program control can further be affected by either the loop terminator or break statement or the loop continue statement. Loops can be immediately terminated by executing the break statement, and can be continued to the next iteration with the continue statement. The following illustrates these programming constructs.

```
for(i = 0; 1; i = i + 1) {
    if(i != 4)
        continue;
    if(i == 4)
        break;
}
```

The above sets up an infinite loop (note that the conditional, which is the second part of for's argument, will never evaluate false), but terminates the loop explicitly if the counter ever reaches the value "4". The continue statement in this example is wholly redundant and is meant for illustration. If the counter is any value other than "4", the loop continues to move forward.

Loop control statements are only valid within loops. It is illegal to attempt to execute a break or continue when not in a loop. Recall that if conditionals are not loops, and recall that the control statement affects the closest loop, as the following illustrates.

```
for(;;)
    while(1)
        if(c == 1)
            break;
```

Here, the continue affects the while, not the for, and is valid because it is executed while at least one loop is in effect. On the other hand, the following is not valid.

```
if(1)
    break;
```

There is no loop present.

12. Conditionals

The CASL conditional statement is if The if statement executes its body of statements if the conditional argument evaluates true; for instance, as demonstrated below.

```
if(i == 1) {
    print(i);
    print("done");
}
```

Here, the if statement executes the code in the body of the conditional if "i" is equal to "1";

Code can also be executed if a loop evaluates false; this is done with an else extension. The body of the else is executed if the condition of the if is false, such as the following illustrates.

```
if(0)
    print("foo");
else
    print("bar");
```

This serves to print the string "bar" (the "0" conditional always evaluates false). The if/else statements can be chained indefinitely, with else if, such as shown below.

```
if(i == 1)
    print("foo");
else if(i == 2)
    print("bar");
else if(i < 4)
    print("baz");
else
    print("quux");
```

This functions to print "foo" if "i" is 1, "bar" if "i" is 2, "baz" if "i" is 3, and "q* *uux" if "i" is any other value.

13. Subroutine calls

A subroutine call diverts control to the code in the named subroutine. It passes arguments (if any) to that subroutine, to affect how that subroutine executes. When the routine finishes, it returns a value, which can be obtained by assigning the subroutine call expression to a variable. The syntax for a call is function(argument0, argument1, argumentN), where "function" is the name of the function (e.g., "ip_input"), and argumentx is the argument at position X. Consider, for instance, a function "foo" that takes as an argument a value, and has as a return value that same value plus one, as shown by the following.

```
// ...
    i = 1;
    i = foo(i);
    print(i)
// ...
```

The code functions to print the value "2".

Specialized Data Types: Lists

One of the most important constructs in the CASL language are lists. Lists represent collections of data, composed of individual variables, which can grow or shrink dynamically. Lists are used to represent complicated strings, packets, and many other things in CASL programs. They can also be used as data structures for CASL programs, like stacks and queues.

A. Creation

Lists are initialized in one of two ways. The first, and most common, is to explicitly create a list using the list composition operators "[" and "]". The square brackets enclose a comma-separate list of elements, and this expression as a whole defines a new list. For instance, the following is an expression defining a list containing the variables "foo", "bar", and "baz", as well as the number "1".

$$[foo, bar, baz, 1]$$

Another way to create a new list is to use a list operator to explicitly assign an element to it. This is done by assigning the name of the list to an expression with a list operator operating on that name and inserting a new element, for instance, as follows.

$$list = list\ push\ foo;$$

This is an expression that creates a new list, called "list", containing solely the element "foo".

B. Recursion

Lists can contain any variable, including other lists. Lists can nest indefinitely. Routines that act on lists expand all elements from all lists in the order it encounters them, so:

$$[\text{``}foo\text{''}, \text{``}bar\text{''}, [\text{``}baz\text{''}, \text{``}quux\text{''}], \text{``}zarkle\text{''}],$$

This defines a string list that will evaluate to the following.

"foo bar baz quux zarkle".

When stepping through a list with list operators, an element of a list that is itself a list will be returned as the entire list, not the first element of the list. So, the same string list above processed with this statement:

$$list = [\text{``}foo\text{''}, \text{``}bar\text{''}, [\text{``}baz\text{''}, \text{``}quux\text{''}], \text{``}zarkle\text{''}];$$
$$x = pop\ list;$$
$$y = pop\ list;$$
$$z = pop\ list;$$
$$print(z);$$

"

This prints the string "baz quux ", because the value of "z" is equal to the third element of the list "list", which is itself a list containing two values.

C. List Operators

There are four list operators. Two of them add elements to the list, and two of them subtract elements from a list. The list operators in an exemplary embodiment include the following.

| | |
|---|---|
| prepend | add an elememt to the head of the list |
| apppend | add an elememt to the tail of the list |
| head | take an element from the head of the list |
| tail | take an element from the tail of the list |

Both head and tail operate on a list, evaluating to the element removed from the list. An example of a head or tail statement is the following.

$$list = [foo, bar, baz];$$
$$x = head\ list;$$
$$print(x);$$

"

This prints the value of "foo", the first item (the "head") of the list. prepend and append operate on a list and an element to add to that list. If the list referred to does not already exist, it is created. An example of an append or prepend statement is the following.

$$list = [foo, bar];$$
$$list = list\ append\ baz;$$
$$print(list); // \text{ list is now } [foo, bar, baz]$$

"

This which prints the values of "foo", "bar", and "baz". The commonly used computer "stack" terms, push and pop, are aliases for prepend and head, respectively.

D. List Control

CASL also provides a control structure for iterating through lists, using a for each construct, which functions to step through each element of a list. A for each statement has two parts: a "binding name" and the list to operate on. For each element of the list, the "binding name" is set to refer to that element. An example of a for each statement is the following.

```
list = [foo, bar, baz];
foreach element[list] – print(element);
"
"
```

This operates to print, in order, the values of "foo", "bar", and "baz". The looping control statements continue and break function as expected in list loops. Note that list expansion within foreach is recursive; a list containing other lists will be expanded to all enlisted data elements.

Packet Headers

An extremely common operation of a CASL script is to create a packet consisting of a series of protocol headers, each of which has a fixed format. Fixed-format protocol headers can be defined in CASL using a protocol structure construct, which lays out bit-by-bit the order and contents of a protocol structure.

A. Definition

Protocol structures are defined by define statements. A define statement creates a new structure with a specified name, which consists of a curly-brace enclosed definition. The definition is in turn composed of field specifiers which dictate the name, length, and order of the protocol fields. A basic protocol structure definition is as follows.

```
define foo -
              // contents here
"
```

This creates a new structure named "foo". The "foo" structure is currently meaningless in the example, because it has not defined any fields. A more concrete example would be as follows.

```
define ip -
    ip_version      : 4 bits;
    ip_headerlen    : 4 bits;
    ip_tos          : 8 bits;
    ip_length       : 16 bits;
    ip_id           : 16 bits;
    ip_df           : 1 bit;
    ip_mf           : 1 bit;
    ip_offset       : 14 bits;
    ip_ttl          : 8 bits;
    ip_protocol     : 8 bits;
    ip_cksum        : 16 bits;
    ip_source       : 32 bits;
    ip_destination  : 32 bits;
```

This defines an IPv4 header. Each specifier enclosed in the braces denotes a field of the structure. Each consists of a name, a colon, and a size. The name can be any valid variable name. The size can be specified in terms of any number of bits, bytes, "words" (e.g., 16-bit quantities), and "dwords" (e.g., 32-bit quantities). Protocol structure definitions can mix any combination of sizes specified in bytes, bits, word, or dwords.

B. Instantiation

A new instance of a protocol structure is created by assigning its name to a variable with the new operator. This creates a buffer large enough to hold that structure, with all fields of the structure set to "0". Assignment of a buffer to another variable copies a reference to the buffer. Consider, for example, the following.

```
x = new ip;
y = x;
z = y;
"
```

Here, "x", "y", and "z" all refer to one copy of the "ip" structures. In order to create a copy of a structure, one uses the copy operator, which creates a logical copy of its operand. For instance, consider the following.

```
x = new ip;
y = copy x;
"
```

Here, x and y are both independent copies of an IP header.

C. Field Reference

Individual fields of a structure are referenced with the field reference or dot operator ".". For instance, if "x" is an "ip" structure, "x.ip_ttl" refers to the "ip_ttl" field of "x". Any number can be assigned to a protocol structure field. Numbers will be packed in Internet byte order into the field, and will only use as many bits as the field is large. Attempting to store a value that is too large for a field's size would trigger an error; if "foo" is a field that is 1 bit wide, "x.foo=4" results in undefined behavior.

D. Special Fields

Every buffer variable has four special fields that reference arbitrary locations within the buffer. These fields are "bits", "bytes", "words", and "dwords", and they are specified with ranges corresponding to how many of these units are being referenced. The syntax of a direct memory reference of a structure follows.

$z$.bits[$x$ ... $y$]bits "$x$" through "$y$" of the buffer "$z$"

$z$.bytes[$x$ ...]bytes "$x$" through the end of buffer "$z$"

$z$.word[$x$]word "$x$" of buffer "$z$"

These expressions all evaluate to integer numbers, and can also be assigned to. Consider, for instance, the following.

$z$.bit[10] = 1;

The above is a valid CASL expression that sets bit "11" (counting from 0) of the buffer "z" to 1.

E. Buffer Size

Since buffers can represent an arbitrary amount of data, their size is obtained explicitly using a size function. The size function evaluates the size, in bytes, of its argument. Consider the following two statements.

```
x = new ip;
print(size(x));
"
```

Bees function to print "20", the size in bytes of an IP header.

F. Structure Extraction

A buffer can contain several structures. Each individual structure can be obtained by extracting data from the buffer with the extract operator. Extract is specified either as:

```
foo = extract bar from baz;
```

This extracts a "bar" structure from the buffer "baz", leaving the remaining bytes in "baz", or as the following.

```
foo = extract z bytes from baz;
```

This extracts "z" bytes from "baz", leaving the remaining bytes.

Subroutines

One of the most powerful features of any programming language is the ability to divide a task into small, reusable components. Small software components are usually expressed as "functions"; a function takes a number of arguments and produces a result depending on those inputs. The proper use of functions not only makes code far more readable, but also allows significant amounts of code to be re-used from project to project.

A. Declaration

Subroutines are defined with the proc keyword. A subroutine takes a fixed number of arguments, and optionally returns a value. Subroutines can be defined anywhere and do not require prototypes, as they do in the "C" language. To declare a new subroutine, one uses the keyword proc, such as illustrated in the following example.

```
proc foo (arg1, arg2, argN) {
    // statements
}
```

Here, "foo" is the name of the new function or procedure, "argx" specifies the name of the argument at place "X", and the body of the function (e.g., collection of statements) appears between the braces. Within the body of the function, the variables named "argX" are replaced by the value of the arguments passed at place "X". For instance, to declare a function called "foo" that takes an argument named "x" and adds "1" to it, one would define the following function or procedure.

```
proc foo (x) {
    x = x + 1;
    print (x);
```

```
"
```

B. Argument Passing

An argument specified in a function's declaration is generally referred to as a "formal argument", as the name of the argument is available to all the statements executed in the body of this function. An argument passed to a function in a subroutine call is referred to as a "calling argument"; its value is made available through the name of the corresponding formal argument. Argument passing in CASL is, with one exception, "by value". Here, the formal argument is bound to the VALUE of the calling argument, not the actual calling argument. For example, in the above-mentioned procedure "foo", the addition of "1" to the argument "x" is never seen by the caller of "foo"; instead, it affects only the variable "x" within the function "foo".

The sole exception to this, in the currently-preferred embodiment, is structure and list passing; references to lists and structures are passed, and changes to them affect the variables on the caller side as well as within the body of the subroutine. This is intended to make it easy to write routines that set fields within structure headers, or change the order of packet lists.

C. Variable Argument Lists

In many cases, it is desirable to create procedures that take a variable number of arguments. Using the list type, CASL directly supports this functionality. A variable-argument function is defined as one that can take more calling arguments than formal arguments. In this case, the final formal argument becomes a list of all the extra calling arguments. Consider, for instance, the following.

```
proc foo (x) {
    ...
}
foo (i, j, k);
```

This defines a function called "foo", which can take a variable number of arguments. The function call to foo( ) specifies three arguments, while the definition specifies one, so "x" becomes a list containing i, j, and k.

D. Return Values

Subroutines end either when the curly brace is reached, or when control reaches a return statement. A return statement ends the execution of a subroutine, and causes the subroutine call to evaluate to the value specified as return's argument. For instance, to make "foo" return the value it calculated, one would change the above function to the following.

```
proc foo (x) {
    x = x + 1;
    return (x);
}
```

A call to "foo" will evaluate to the argument passed to foo, plus "1". Any variable can be returned through the return statement. Multiple values are returned from a function using list variable returns.

E. Scope

An important issue in programming languages with variables and routines is that of variable "scope". The scope is the space within which a variable is valid. When a program is executing within a subroutine, any variables it defines are accessible only within that execution of that subroutine; the caller of the subroutine cannot access variables defined in the subroutine.

Code that is not executing within a subroutine is in "global" scope. Variables defined in global scope are accessible anywhere, even within subroutines, as the following example illustrates.

```
i = 1;        // global foo(i);

proc foo(x) { x = x + 1;  // local, "x" can only be accessed within "foo"

y = i;      // "y" is local and can only be accessed within

// "foo", but "i" is global and can be accessed

// anywhere.

return(x);
```

Network I/O

CASL supports two basic primitives for network I/O: IP output and IP input. IP output writes a complete IP packet, including the IP header, to the network; likewise, IP input reads a complete packet, starting with the IP header, from the wire.

A. Output

IP output in CASL is accomplished via the ip_output( ) routine, which takes as an argument a list of data elements that are expected to comprise an IP packet; a single buffer variable can also be passed to ip_output for writing as well. Successfully sending a well-formed IP packet involves troublesome issues, including checksum and length calculation. The IP and transport headers require knowledge of the length of the entire packet, the lengths of the individual headers, and the calculation of a checksum over some of these headers and some of the data. Both of these issues can be resolved by writing CASL code to compute checksums and lengths. However, this code can potentially be cumbersome and error-prone.

Rather than requiring the implementation of CASL-scripted checksum and length calculation, the CASL interpreter provides a few shortcuts to solve these issues transparently. For the basic IP protocols (e.g., IP, TCP, UDP, and ICMP), the CASL interpreter will automatically calculate checksum fields, packet lengths, and header lengths. The appropriate values will be filled in before the packet is written to the wire; the computed values will not affect the passed-in data, only the packet written to the wire. In order to allow for arbitrary packets (possibly with intentionally bad header values) to be sent, CASL will not touch header fields it thinks have explicitly been filled in. For the basic IP protocols, this means that CASL will not fill in values for fields that already have nonzero values.

B. Fixups

In many cases, it may be important to fill in the variable header fields of an IP datagram without outputting it to the network. This is a common requirement of IP fragmentation code, for example. CASL supports this with the ip_fixup( ) procedure, which takes the same arguments as ip_output( ), but, instead of outputting the packet to the network, it returns a new packet, which is a copy of the input with the appropriate header fields filled in.

C. Input

Packet input in CASL is done using the ip_input( ) routine, which takes as arguments a timeout value, specified in milliseconds, and a "tcpdump" filter. The timeout specifies how long to wait for a packet before giving up, and the filter defines which packets to read. If the millisecond timer runs out before a packet is read, ip_input returns the integer value "0". If a packet is read successfully within the allotted time, it is returned, minus the link-layer (Ethernet) header, as a buffer. The size of the buffer can be queried with "size( )" to determine the length of the inputted packet.

D. Filtering

CASL also allows the explicit setting of global filters that affect all reads by using the ip_filter( ) routine, which takes as an argument a "tcpdump" filter, through which all packets read by CASL must successfully pass before being returned via ip_input. On some computer architectures, notably 4.4BSD, ip_filter( ) also sets kernel packet filters. The enabling of a kernel packet filter prevents the CASL interpreter from reading packets that the programmer does not intend to have read; this can be a major performance benefit, as it prevents the CASL interpreter from needing to explicitly filter out spurious packets.

The filtering mechanism currently used by CASL employs the Berkeley Packet Filter (BPF), designed by Steven McCanne at Lawrence Berkeley Laboratories. For a detailed discussion of the Berkeley Packet Filter, see e.g., McCanne, S and Jacobson, V., *The BSD Packet Filter: A New Architecture for User-level Packet Capture*, Proceedings of the 1993 Winter USENIX Technical Conference, San Diego, Calif., January 1993, USENIX, the disclosure of which is hereby incorporated by reference. BPF provides a low-level filtering mechanism that can be used to detect, and filter based on, arbitrary patterns of bits and bytes.

BPF is a low level language which resembles the machine code for a hypothetical primitive computer system. In order to increase its usability, BPF instructions are often compiled from a high-level language. A very popular network monitoring package called "tcpdump" McCanne and Leres describe one such language, designed for filtering TCP/IP packets; see e.g., McCanne, S and Leres, C., *tcpdump, The Protocol Packet Capture and Dumper Program*, source code currently available via the Internet at ftp://ftp.ee.lbl.gov/tcpdump.tar.Z (provided to the public by the Network Research Group at Lawrence Berkeley Laboratories in Berkeley, Calif.), the disclosure of which is hereby incorporated by reference. Because this language can be used to directly emit BPF instructions, which can be used for fast packet filtering, CASL uses it for IP filtering operations in packet input. The CASL language itself is ideally suited for packet filtering operations. It is not difficult to modify CASL to translate CASL bit operations into BPF instructions, thus providing direct fast packet filtering in the CASL language itself."

Built-in Functions (Runtime Library)

In addition to the language and network I/O functionality supported implicitly by CASL, the interpreter includes a variety of built-in or run-time library functions to support functions that cannot easily be performed directly by the language.

The following is an overview of the built-in functions provided with CASL in the currently-preferred embodiment.

print( )

The print( ) function takes a list of data elements to write to standard output. It writes each of these elements, separated by a space, to standard output, followed by a newline.

checksum( )

The checksum( ) function takes a list of data elements to perform an Internet checksum on. It returns an integer representing the checksum of these elements.

timer_start( )

The timer_start( ) function starts a stopwatch timer in the CASL interpreter. It returns a descriptor number, which can be used to retrieve the amount of time that has elapsed since the timer started.

timer stop( )

The timer_stop( ) function takes a descriptor number as an argument, stops the stopwatch timer associated with the descriptor, and returns the number of milliseconds that have elapsed since the timer was started.

tobuf( )

The tobuf( ) function takes a list as an argument, and returns a buffer containing the ordered contents of that list.

atoi( )

The atoi( ) function takes a string as an argument, and returns the integer represented by that string.

wait( )

The wait( ) function takes an integer as an argument, representing the number of seconds for the interpreter to wait before continuing.

getip( )

The getip( ) function takes a string as an argument, and returns a number representing the IP address contained in that string.

putip( )

The putip( ) function takes a binary IP address as an argument, and returns a string representing that IP address.

open( )

The open( ) function takes a filename as an argument, and returns a descriptor number that can be used to manipulate that file. If the file does not exist, it will be created; if it does, it will be appended to. If the file cannot be opened, "0" is returned.

close( )

The close( ) function takes a descriptor number as an argument, and closes the associated file, flushing any pending output and preventing further manipulation of the file.

read( )

The read( ) function takes as arguments a descriptor number and a count of bytes to read. It reads at most the specified number of bytes from the file, and returns a buffer containing those bytes. The number of bytes actually read by the file can be queried with the "size( )" command; if no data was read, "0" will be returned.

write( )

The write( ) function takes as arguments a descriptor and a data element (which can be a list or a buffer, or any of the basic types) to write to the file matching that descriptor. The number of bytes written to the file is returned.

fgets( )

The fgets( ) function takes as arguments a descriptor and a number representing the maximum number of characters to read from a file. It then reads at most that many characters, stopping when a line terminator (the newline character) is found. It returns the data read, or "0" if nothing was read.

rewind( )

The rewind( ) function repositions the offset into the descriptor given as an argument, so that it points to the beginning of the file. This allows the same data to be read from the same file descriptor twice.

fastforward( )

The fastforward( ) function repositions the offset into the descriptor given as an argument, so that it points to the end of the file. This allows recovery from rewinds, for further writing.

remove( )

The remove( ) function deletes the specified file from the system, returning "1" if successful.

Example CASL Program Script

The following working example illustrates a simple TCP "stealth scan", which is attempting to find "listening" ports on a remote machine. This example demonstrates many aspects of CASL, including use of CASL for packet creation, output, input, packet parsing, and user output.

A. Basic Script Components

1. Includes

Returning to the example of a "stealth scanner", the script includes the definitions for basic IP packets, such as follows.

```
#include "tcpip.casl"
#include "packets.casl"
```

Here, "packets.casl" defines "template" packets for common IP packet header defaults.

2. Packet Output

The simplest way to accomplish a silent TCP port scan is to perform a "half-open port scan"; this involves requesting a new connection by sending a (protocol-compliant) TCP SYN packet, waiting for the SYN+ACK response to that packet, but not completing the connection with the final client ACK packet. In order to do this, SYN packets will need to be sequentially sent to the target host, with the client waiting for TCP responses. The response can be a SYN+ACK packet, indicating that something was actually listening and willing to accept a connection for that port, an RST packet, indicating that nothing was accepting a connection for that port, or no response, possibly indicating that something was filtering out the connection attempt.

The first task, therefore, is creation of a SYN packet. This involves creation of both a TCP and an IP packet header. Both can be done easily by using the predefined TCP "template" packet headers and filling in the values that need to change (e.g., the TCP source and destination ports, and the IP source and destination addresses). For example:

```
OurSYN = copy SYN;
OurSYN.tcp_source = 10;
OurSYN.tcp_destination = 2049;
```

This creates a new TCP SYN header, and assigns a source port of "10" (i.e., some bogus random number) and a destination port of "2049" (the TCP NFS port).

A TCP header by itself is worthless; the packet needs an IP header, to tell it which host the packet is destined for. An IP header is created for a TCP packet much the same way the TCP header was created:

```
OurIP = copy TCPIP;
OurIP.ip_source = 127.0.0.1;
```

-continued

OurIP.ip_destination = 127.0.0.2;

Here, the example assumes that "127.0.0.2" is being scanned from "127.0.0.1" (i.e., contrived example values). Since the TCPIP template header is being used, the other header values are already filled in. These two headers together create a complete TCP connection request. To write them to the network, they need to be combined; this is done using a list variable:

PacketList = [OurIP, OurSYN];

This creates a new list called "PacketList", and includes in that list the IP and TCP headers, in that order. The opening bracket starts the list, the closing bracket ends it, and individual values are separated by a comment. This is a simple example; lists can contain many more values, and even other lists. This is also just one way to build a list; another is to build it incrementally, using the list operators:

PacketList = PacketList push OurSYN;

PacketList = PacketList push OurIP;

This adds the TCP and IP headers to the list separately, "pushing" each element onto the list. The last element pushed into the list will be the first element written to the list; the push operator duplicates the behavior of a computer "stack".

Packets are output onto the network with the ip_output( ) function. The function takes as it's sole argument a list representing a packet to be written to the network, and:

ip_output(PacketList);

This writes the packet to the network.

A stealth scanner would not be too useful if it could only monitor a single port. A good start might be to try all the "reserved" ports (those between "1" and "1023"), where many of the standard network services listen. To do this, what is needed is to loop through each of these port numbers. The easiest way to loop between two fixed numbers is to use a for statement:

for(i = 1; i < 1023; i = i + 1) {

// work here

}

The C-style for statements are defined by three parameters. The first usually tells where to start counting from, the second tells how long to count for (here, "as long as the count is below 1023"), and the third tells how far to step forward each step. The actual statements to be executed by the loop are enclosed in curly braces. The variable "i" that has been created to act as the counter, and therefore the current count can be seen within the loop by accessing it. Accordingly, one formulate multiple requests as follows.

for(i = 1; i < 1023; i = i + 1) {

-continued

OurSYN = copy SYN;

OurSYN.tcp_source = 10;

OurSYN.tcp_destination = i;

OurIP = copy TCPIP;

OurIP.tcp_source = 127.0.0.1;

OurIP.tcp_destination = 127.0.0.2;

OurPacket = [OurIP, OurSYN];

ip_output(OurPacket);

}

This serves to send connection requests to each of the reserved ports.

3. Packet Input

The packet-input portion of code will actually send connection requests to each reserved ports. To determine whether the host answered the connection request, an ip_input routine is employed. The ip_input( ) routine takes two arguments. The first is a timeout, specified in milliseconds, which tells the CASL interpreter how long to wait before giving up. The second argument is a "tcpdump" filter(s) that specifies which kinds of packets are desired to be read. The tcpdump filter(s) are passed to ip_input( ) as either a string or a list; the easiest way to create one is to build it from a list. For instance, to read the response to one of the packets, the following might be done:

*OurFilter* = [*"src host"*, 127.0.0.2, *"and tcp src port"*, *i*];

This corresponds to a filter string of: "src host 127.0.0.2 and tcp src port 103". Here, "i", the counter in the loop, is equal to 103.

The ip_input( ) routine is the first function that returns a value. The return value of a function is obtained by assigning the call of the function to a variable; for instance:

*ReadPacket* = ip_input(2000, *OurFilter*);

This in effect says, "Wait at most 2 seconds to read any packet matching the filter just created, and assign the packet that was read to the variable ReadPacket".

If ip_input( ) fails to read a packet, it will return the value "0"; otherwise, it will return a buffer variable containing the packet it just read. Every time ip input( ) is called, it should be checked to make sure it successfully read a packet; this is done by comparing the returned value to "0".

if (*ReadPacket* == 0)
    continue;

Notice that the comparison operator is the C-style operator (i.e., ==); this is to distinguish it from the assignment operator. The C-style continue statement instructs the system to move forward in the loop. Note also that, since only one statement is executing in this conditional, one does not need to use the curly braces. If more than one thing needed to be done inside the condition, the statements would need to be enclosed in braces.

If ip_input is successful, it returns a complete IP packet. It should be checked to see if the packet is a TCP SYN+ACK or a TCP RST. There are a number of things that need to be checked to do this. The first is the size of the packet; it must be large enough to contain at least an IP and TCP header. This is done using the size( ) function:

$$if(size(ReadPacket) < size(ip) + size(tcp))$$
$$continue;$$

This statement instructs the interpreter to keep moving in the loop if the packet just read is smaller in size than the sum of the sizes of a TCP and IP header (in other words, if the packet is too short). Note that what is being looked at is the size of "ip" and "tcp", not "TCPIP" and "SYN"; "ip" is the actual definition of an IP header, and "tcp" that of a TCP header. Both are defined in "tcpip.casl".

If it is certain that the packet is large enough, the next thing to do is to extract the headers from it. This is straightforward:

$$ReadIP = \text{extract ip from packet};$$
$$ReadTCP = \text{extract tcp from packet};$$

Here, each-header is extracted with the extract operator, which removes the specified header structure from the buffer and leaves the remaining bytes.

Once the headers are extracted from the packet, the individual fields of the TCP header can be examined. Here, the user makes sure that the SYN and ACK fields are set, and that RST is not. If this is the case, the port is actually accepting connections; otherwise, it probably is not.

$$if\left(ReadTCP.tcp\_ack \mathrel{!}= 1 || ReadTCP.tcp\_syn \mathrel{!}= 1 || ReadTCP.tcp\_rst == 1\right)$$
$$continue;$$

The C-style "//" symbol is a logical "or", and "!=" is the logical "not equal". Therefore, the statement reads: "If the ACK flag is not set, or the SYN flag is not set, or the RST flag IS set . . . ". The user can combine any number of conditions using these logical operators.

If all these conditions are passed, the port is alive, and the user is informed accordingly using a "print" function, which takes as its argument a list or string to print.

$$print(\text{"Port"}, i, \text{"Alive"});$$

This prints "Port 1022 Alive", if the counter "i" equals "1022".

B. The-Finished Script

The following discussion presents a complex example that is encapsulated in a simple CASL script. In order to actually make use of a CASL script, the user runs a machine-specific CASL interpreter, providing a suitable script as input. CASL interpreters are currently available (from present assignee Network Associates, Inc., of Santa Clara, Calif.) for i386 Windows NT, Linux, and 4.4BSD systems, as well as SPARC (RISC) Solaris systems. In most environments, a user has installed the CASL interpreter in a well-known location on a file system on the machine the script is to be run from. For instance, under Windows NT, CASL usually resides in the "\Program Files\Network Associates\CASL\bin" directory. A user launches the CASL interpreter, a Windows NT executable program, by entering its name on the system's command line, as in "c:\Program Files\Network Associates\CASL\bin\casl.exe".

Scripts are provided to CASL by specifying their filename as a command-line argument to the interpreter. If the example script provided were named "half-scan.casl", for instance, the command-line execution of the script would be "casl.exe half-scan.casl", which would cause the CASL interpreter to interpret and execute the script. Under UNIX environments, CASL scripts can be launched directly, without invoking the interpreter explicitly, thus making the scripts seem like standard executable programs themselves. This is done by providing a path to the CASL interpreter as the first line of the script, in the following format (we assume here that the CASL interpreter is located in "/usr/local/casl/bin"): "#!/usr/local/casl/bin/casl"

The example CASL script is as follows.

```
#include "tcpip.casl"
#include "packets.casl"
for(i = 1; i < 1023; i = i + 1) {
    OurSYN = SYN;
    OurSYN.tcp_source = 10;
    OurSYN.tcp_destination = i;
    OurIP = copy TCPIP;
    OurIP.tcp_source = 127.0.0.1;
    OurIP.tcp_destination = 127.0.0.2;
    OurPacket = [ OurIP, OurSYN ];
    ip_output (OurPacket);
    OurFilter
        = [ "src host ", 127.0.0.2, "
        and tcp src port", i ];
    Readpacket = ip_input(2000, OurFilter);
                        if(ReadPacket ==
        0)
        continue;
    if(size(ReadPacket) < size(ip) +
size(tcp))
        continue;
    if(ReadTCP.tcp_ack != 1
    | ReadTCP.tcp_syn != 1
    | ReadTCP.tcp_rst == 1)
        continue;
    print("Port", i, "Alive");
}
```

This script may now be processed by the CASL interpreter, replacing the IP addresses with the user's own source address and the address of a machine the user wants to scan. By replacing the user's source address with that of a neighboring machine (if the user shares an Ethernet with that host), the user can forge the entire scan from that machine, and still see the responses. In many instances, the user simply wants to forge a packet to see if it crashes a machine, or passes through a packet filter. These types of scripts usually take only, a few lines, and do not involve any of the programming constructs (like for( ) loops and if( ) conditionals).

Attached herewith is a microfiche appendix including C source code listings providing further description of the present invention. A suitable C/C++ compiler/linker for compiling the listings is available from a variety of vendors, including Visual C++ available from Microsoft Corporation of Redmond, Wash.

While the invention is described in some detail with specific reference to a single preferred embodiment and certain alternatives, there is no intent to limit the invention to that particular embodiment or those specific alternatives.

Thus, the true scope of the present invention is not limited to any one of the foregoing exemplary embodiments but is instead defined by the appended claims.

What is claimed is:

1. A system for building an executable script for performing a network security audit, comprising:
    a stored source program expressed in a network packet simulation language and comprising a plurality of statements encoding logic to simulate an exchange of network protocol compliant-packets;
    a program generator, comprising:
        a scanner scanning each statement into a sequence of individual tokens;
        a parser parsing each token into grammatical phrases comprising at least one of an expression and a control construct, each expression evaluating to a data value and each control construct defining a process flow; and
        a compiler compiling the grammatical phrases into program instructions to execute the logic on a target machine.

2. A system according to claim 1, wherein the program instructions comprise a bytecode sequence encoding opcode instructions, further comprising:
    a runtime interpreter interpreting the bytecode sequence; and
    a processor executing the logic on the target machine.

3. A system according to claim 1, wherein the program instructions comprise native machine code for the target machine, further comprising:
    a processor executing the machine code on the target machine.

4. A system according to claim 1, further comprising:
    a stored runtime library comprising a set of executable routines, each comprising pre-compiled instructions to execute built-in logic on the target machine.

5. A system according to claim 4, further comprising:
    a processor performing a call from at least one such program instruction to at least one such executable routine in the runtime library to execute the built-in logic on the target machine.

6. A system according to claim 4, wherein the runtime library comprises at least one of a stand-alone library and an embedded library.

7. A system according to claim 1, further comprising:
    a language specification defining a set of primitives simulating network protocol-specific operations directly performed on individual data packets.

8. A system according to claim 1, further comprising:
    a processor instantiating a data structure simulating an individual data packet.

9. A system according to claim 1, wherein the tokens comprise at least one of identifiers, delimiters, numbers, operators, and expressions.

10. A method for building an executable script for performing a network security audit, comprising:
    storing a source program expressed in a network packet simulation language and comprising a plurality of statements encoding logic to simulate an exchange of network protocol compliant-packets;
    scanning each statement into a sequence of individual tokens;
    parsing each token into grammatical phrases comprising at least one of an expression and a control construct, each expression evaluating to a data value and each control construct defining a process flow; and
    compiling the grammatical phrases into program instructions to execute the logic on a target machine.

11. A method according to claim 10, wherein the program instructions comprise a bytecode sequence encoding opcode instructions, further comprising:
    interpreting the bytecode sequence; and
    executing the logic on the target machine.

12. A method according to claim 10, wherein the program instructions comprise native machine code for the target machine, further comprising:
    executing the machine code on the target machine.

13. A method according to claim 10, further comprising:
    maintaining a runtime library comprising a set of executable routines, each comprising pre-compiled instructions to execute built-in logic on the target machine.

14. A method according to claim 13, further comprising:
    performing a call from at least one such program instruction to at least one such executable routine in the runtime library to execute the built-in logic on the target machine.

15. A method according to claim 13, wherein the runtime library comprises at least one of a stand-alone library and an embedded library.

16. A method according to claim 10, further comprising:
    defining a set of primitives simulating network protocol-specific operations directly performed on individual data packets.

17. A method according to claim 10, further comprising:
    instantiating a data structure simulating an individual data packet.

18. A method according to claim 10, wherein the tokens comprise at least one of identifiers, delimiters, numbers, operators, and expressions.

19. A computer-readable storage medium for a device holding code for performing a method for building an executable script for performing a network security audit, comprising:
    storing a source program expressed in a network packet simulation language and comprising a plurality of statements encoding logic to simulate an exchange of network protocol compliant-packets;
    scanning each statement into a sequence of individual tokens;
    parsing each token into grammatical phrases comprising at least one of an expression and a control construct, each expression evaluating to a data value and each control construct defining a process flow; and
    compiling the grammatical phrases into program instructions to execute the logic on a target machine.

* * * * *